United States Patent
Stoehr

(10) Patent No.: US 11,498,360 B2
(45) Date of Patent: Nov. 15, 2022

(54) HYBRID BEARING ARRANGEMENT CASTER TECHNOLOGY

(71) Applicant: NGS Capital Management, LLC, Oconomowoc, WI (US)

(72) Inventor: Kyle C. Stoehr, Okauchee, WI (US)

(73) Assignee: NGS CAPITAL MANAGEMENT, LLC, Oconomowoc, WI (US)

( * ) Notice: Subject to any disclaimer, the term of this patent is extended or adjusted under 35 U.S.C. 154(b) by 0 days.

(21) Appl. No.: 16/418,243

(22) Filed: May 21, 2019

(65) Prior Publication Data

US 2020/0369083 A1  Nov. 26, 2020

(51) Int. Cl.
*B60B 33/00* (2006.01)

(52) U.S. Cl.
CPC ...... *B60B 33/0042* (2013.01); *B60B 33/0068* (2013.01); *B60B 2380/14* (2013.01); *B60B 2380/20* (2013.01)

(58) Field of Classification Search
CPC ............ B60B 33/0028; B60B 33/0042; B60B 33/0047; B60B 33/0057; B60B 33/0049; B60B 3/048; B60B 27/001; B60B 27/005; B60B 33/0068; B60B 2380/20; B60B 2380/14

See application file for complete search history.

(56) References Cited

U.S. PATENT DOCUMENTS

| 11,506 A | 8/1854 | White |
|---|---|---|
| 285,912 A | 10/1883 | Meehan |
| 978,161 A | * 12/1910 | Holmes ............... B60B 33/0028 16/40 |
| 1,429,118 A | 9/1922 | Townsend |

(Continued)

FOREIGN PATENT DOCUMENTS

| CH | 477999 A | 9/1969 |
|---|---|---|
| CN | 100556716 C | 11/2009 |

(Continued)

OTHER PUBLICATIONS

The Best Designers of the Red Dot Award: Product Design 2006: Roland Kausemann, Frank Newey, Jorg Ostrenrieder and Marcus Widermann: www.en.red-dot.org/1851.htm [accessed on Apr. 29, 2009, 3 pages].

(Continued)

*Primary Examiner* — Emily M Morgan
(74) *Attorney, Agent, or Firm* — Fredrikson & Byron, P.A.

(57) ABSTRACT

The invention provides a caster including two wheels, a central frame member, and a mount member. The two wheels are mounted on the mount member. The caster has a hybrid bearing arrangement comprising both a rolling bearing and two slide bearings. The rolling bearing is located between the central frame member and the mount member and is configured to enable the caster to roll along a straight line with each of the two wheels rotating in a common direction about a first axis. Each of the two slide bearings is located between the mount member and a tread portion of a respective one of the two wheels. The slide bearings are configured to enable the two wheels to simultaneously rotate in opposite directions when the caster swivels about a second axis orthogonal to the first axis. In some embodiments, the caster is a hubless caster.

11 Claims, 8 Drawing Sheets

(56) References Cited

U.S. PATENT DOCUMENTS

| | | | |
|---|---|---|---|
| 1,458,812 A | 6/1923 | Fay |
| 1,617,085 A | 2/1927 | Specht |
| 1,632,435 A | 6/1927 | Raleigh |
| 1,665,882 A | 4/1928 | Jarvis et al. |
| 1,697,485 A | 1/1929 | Ware |
| 1,761,319 A | 6/1930 | Vollmer |
| RE17,950 E | 2/1931 | Herold |
| 1,827,320 A | 10/1931 | Kusterle |
| 1,879,429 A | 9/1932 | Noelting et al. |
| 2,076,239 A | 4/1937 | Lemmon |
| 2,544,924 A | 3/1951 | Herold |
| 2,701,740 A | 2/1955 | Norman |
| 2,970,673 A | 2/1961 | Isbell |
| 2,973,546 A | 3/1961 | Roche |
| 2,998,287 A | 8/1961 | Pritchett |
| 3,128,495 A | 4/1964 | Tooth |
| 3,166,781 A | 1/1965 | Schultz, Jr. |
| 3,197,802 A | 8/1965 | Fontana et al. |
| 3,210,795 A | 10/1965 | Fontana |
| 3,230,575 A | 1/1966 | Schultz, Jr. |
| 3,397,938 A | 8/1968 | Juelss |
| 3,526,921 A | 9/1970 | Aupke |
| 3,571,842 A | 3/1971 | Fricke |
| 3,588,206 A | 6/1971 | Frost |
| 3,755,852 A | 9/1973 | Greene |
| 3,807,817 A | 4/1974 | Black |
| 3,834,006 A | 9/1974 | Greene |
| 3,971,601 A | 7/1976 | Sytsma |
| 3,977,040 A | 8/1976 | Sugasawara |
| 3,997,938 A * | 12/1976 | Pinaire ................ B60B 33/0042 |
| | | | 16/45 |
| 4,019,789 A | 4/1977 | Rosin et al. |
| 4,037,292 A | 7/1977 | Lapham |
| 4,045,096 A | 8/1977 | Lidov |
| 4,054,335 A | 10/1977 | Timmer |
| 4,068,342 A | 1/1978 | Carrier |
| 4,086,680 A | 5/1978 | Kelly |
| 4,109,343 A | 8/1978 | Weis et al. |
| 4,110,866 A | 9/1978 | Ishii |
| 4,129,921 A | 12/1978 | Greene |
| 4,219,240 A | 8/1980 | Brandenstein et al. |
| 4,219,904 A | 9/1980 | Melara |
| 4,282,629 A | 8/1981 | Demrick et al. |
| 4,348,785 A | 9/1982 | Jordan |
| 4,361,930 A | 12/1982 | Seesengood |
| 4,367,905 A | 1/1983 | Nauta |
| 4,404,707 A | 9/1983 | Walker |
| 4,409,715 A | 10/1983 | Timmer |
| 4,465,321 A | 8/1984 | Berg |
| 4,479,566 A | 10/1984 | Ishii |
| 4,484,525 A | 11/1984 | Forshee et al. |
| 4,490,128 A | 12/1984 | Weiss et al. |
| 4,534,749 A | 8/1985 | Rudiger et al. |
| 4,535,196 A | 8/1985 | Milne |
| 4,544,425 A | 10/1985 | Provolo |
| 4,693,698 A | 9/1987 | Olson, II |
| 4,706,329 A * | 11/1987 | Screen ................ B60B 33/0028 |
| | | | 16/47 |
| 4,720,894 A | 1/1988 | Deasy et al. |
| 4,788,741 A | 12/1988 | Hilborn |
| 4,793,021 A | 12/1988 | Deasy |
| 4,916,801 A | 4/1990 | Cooper |
| 4,993,538 A | 2/1991 | Norbury |
| 5,062,178 A | 11/1991 | Chiu |
| 5,066,145 A | 11/1991 | Sibley et al. |
| 5,068,943 A | 12/1991 | Estkowski et al. |
| 5,078,221 A | 1/1992 | Rewitzer |
| 5,119,525 A | 6/1992 | Melara |
| 5,181,587 A | 1/1993 | Masatoshi |
| 5,199,131 A | 4/1993 | Harris |
| 5,226,739 A | 7/1993 | Estkowski et al. |
| 5,230,571 A | 7/1993 | Estkowski et al. |
| 5,232,071 A | 8/1993 | Kawanabe |
| 5,248,019 A | 9/1993 | Sbarro |
| 5,263,238 A | 11/1993 | Cooper |
| 5,275,472 A | 1/1994 | Hicks |
| 5,277,126 A | 1/1994 | Wendt et al. |
| 5,303,449 A | 4/1994 | Gray |
| D347,161 S | 5/1994 | Conaway et al. |
| 5,357,868 A | 10/1994 | Mass |
| 5,366,406 A | 11/1994 | Hobbel et al. |
| 5,368,133 A | 11/1994 | Yang |
| 5,390,393 A | 2/1995 | Reppert et al. |
| 5,408,723 A | 4/1995 | Julien |
| 5,419,619 A | 5/1995 | Lew |
| 5,490,719 A | 2/1996 | Lew |
| 5,493,755 A | 2/1996 | Kindstrand et al. |
| 5,566,623 A | 10/1996 | Wareham |
| 5,568,671 A | 10/1996 | Harris et al. |
| 5,690,395 A | 11/1997 | Hicks |
| 5,871,286 A * | 2/1999 | Kern ........................ B60B 5/02 |
| | | | 384/280 |
| 6,179,701 B1 | 1/2001 | Tieleman |
| 6,336,685 B1 | 1/2002 | Orr |
| 6,601,271 B1 | 8/2003 | Sommerfeld et al. |
| 6,619,438 B1 | 9/2003 | Yang |
| 6,748,623 B1 | 6/2004 | Tsai |
| 6,810,561 B1 | 11/2004 | Liu |
| 6,839,939 B2 | 1/2005 | Donakowski |
| 6,854,893 B2 | 2/2005 | Schmidt |
| 6,880,203 B1 | 4/2005 | Aubin |
| 6,915,745 B2 | 7/2005 | Carder |
| 7,041,020 B2 | 5/2006 | Singer |
| 7,207,084 B2 | 4/2007 | Melara |
| 7,392,581 B2 | 7/2008 | Sano et al. |
| 7,435,005 B2 | 10/2008 | Schmidl et al. |
| 7,448,807 B2 | 11/2008 | Schenk et al. |
| 7,647,673 B2 * | 1/2010 | Melara ................ B60B 33/001 |
| | | | 16/35 R |
| 7,657,969 B2 | 2/2010 | Trivini |
| 8,272,469 B2 | 9/2012 | Stoehr et al. |
| 8,375,515 B2 | 2/2013 | Hozumi et al. |
| 8,522,397 B1 | 3/2013 | Tsai |
| 8,549,705 B1 * | 10/2013 | Wu ........................ B60B 33/0028 |
| | | | 16/45 |
| 8,561,258 B2 | 10/2013 | Breyer et al. |
| D731,878 S | 6/2015 | Lindsay et al. |
| 9,168,689 B2 * | 10/2015 | Stoehr ................ B60B 33/0028 |
| 9,266,393 B2 | 2/2016 | Yao |
| 9,387,723 B2 | 7/2016 | Beatty |
| 9,630,450 B1 * | 4/2017 | Chang ................ B60B 33/0039 |
| 9,669,658 B1 * | 6/2017 | Tong ................ B60B 33/0042 |
| D795,045 S | 8/2017 | Diz et al. |
| 10,035,376 B2 * | 7/2018 | Stoehr ................ B60B 33/0057 |
| 10,059,148 B2 * | 8/2018 | Lai ................ B60B 33/0047 |
| 10,595,607 B1 | 3/2020 | Wang |
| 10,913,312 B1 * | 2/2021 | Tsai ................ B60B 33/0086 |
| 2003/0163892 A1 | 9/2003 | Kausemann |
| 2004/0140160 A1 | 7/2004 | Carder |
| 2005/0081329 A1 | 4/2005 | Tsai |
| 2005/0120514 A1 * | 6/2005 | Donakowski ....... B60B 33/0073 |
| | | | 16/45 |
| 2007/0044273 A1 | 3/2007 | Milbredt |
| 2007/0107160 A1 * | 5/2007 | Jane Santamaria ......................... |
| | | | B60B 33/0042 |
| | | | 16/46 |
| 2007/0186373 A1 * | 8/2007 | Melara ................ B60B 33/0068 |
| | | | 16/35 R |
| 2008/0163455 A1 | 7/2008 | Tsai |
| 2009/0193621 A1 * | 8/2009 | Melara ................ B60B 33/0028 |
| | | | 16/35 R |
| 2009/0314596 A1 | 12/2009 | Miyoshi |
| 2010/0077562 A1 | 4/2010 | Block et al. |
| 2010/0175222 A1 | 7/2010 | Fallshaw et al. |
| 2010/0287730 A1 | 11/2010 | Von Bordelius |
| 2010/0306961 A1 | 12/2010 | Breyer |
| 2011/0144848 A1 | 6/2011 | Yoshizue et al. |
| 2011/0203074 A1 * | 8/2011 | Trivini ................ B60B 33/0049 |
| | | | 16/45 |
| 2011/0232027 A1 | 9/2011 | Block et al. |
| 2013/0326844 A1 * | 12/2013 | Stoehr ................ B60B 33/0057 |
| | | | 16/18 R |
| 2014/0101891 A1 | 4/2014 | Hofrichter et al. |

(56) References Cited

U.S. PATENT DOCUMENTS

| | | |
|---|---|---|
| 2016/0052339 A1 | 2/2016 | Dayt |
| 2016/0107481 A1 * | 4/2016 | Stoehr ................ B60B 33/0068 16/46 |
| 2017/0119607 A1 | 5/2017 | Derenne et al. |
| 2018/0117963 A1 * | 5/2018 | Chien ................ B60B 33/0047 |
| 2018/0162160 A1 * | 6/2018 | Lai ...................... B60B 33/0002 |
| 2019/0160869 A1 | 5/2019 | Stoehr et al. |

FOREIGN PATENT DOCUMENTS

| | | | | |
|---|---|---|---|---|
| DE | 904755 | C | 2/1954 | |
| DE | 2232752 | A1 | 1/1974 | |
| DE | 9316374 | U1 | 1/1994 | |
| DE | 10128099 | A1 | 12/2002 | |
| DE | 202019106862 | U1 * | 1/2020 | ............. B60B 33/00 |
| EP | 3335903 | A1 * | 6/2018 | |
| EP | 3669694 | A1 * | 6/2020 | ......... B60B 33/0028 |
| FR | 2526909 | A1 | 11/1983 | |
| GB | 967915 | A | 8/1964 | |
| GB | 1009817 | A | 11/1965 | |
| GB | 1418716 | A | 12/1975 | |
| GB | 2272366 | A | 5/1994 | |
| JP | S57121902 | A | 7/1982 | |
| WO | 2005118314 | A1 | 12/2005 | |
| WO | 2005119074 | A1 | 12/2005 | |
| WO | 2008034741 | A1 | 3/2008 | |
| WO | WO-2018015578 | A1 * | 1/2018 | ......... B60B 33/0086 |

OTHER PUBLICATIONS

The North American Performance Standard for Casters and Wheels, Institute of Caster and Wheel Manufacturers, 2005, 67 pages.
General Purpose Office Chairs—Tests, American National Standard for Office Furniture, BIFMA International, 2002, 96 pages.
Form Magazine No. 122 II, 1988, pp. 20-23, with partial English machine translation, 8 pages.

* cited by examiner

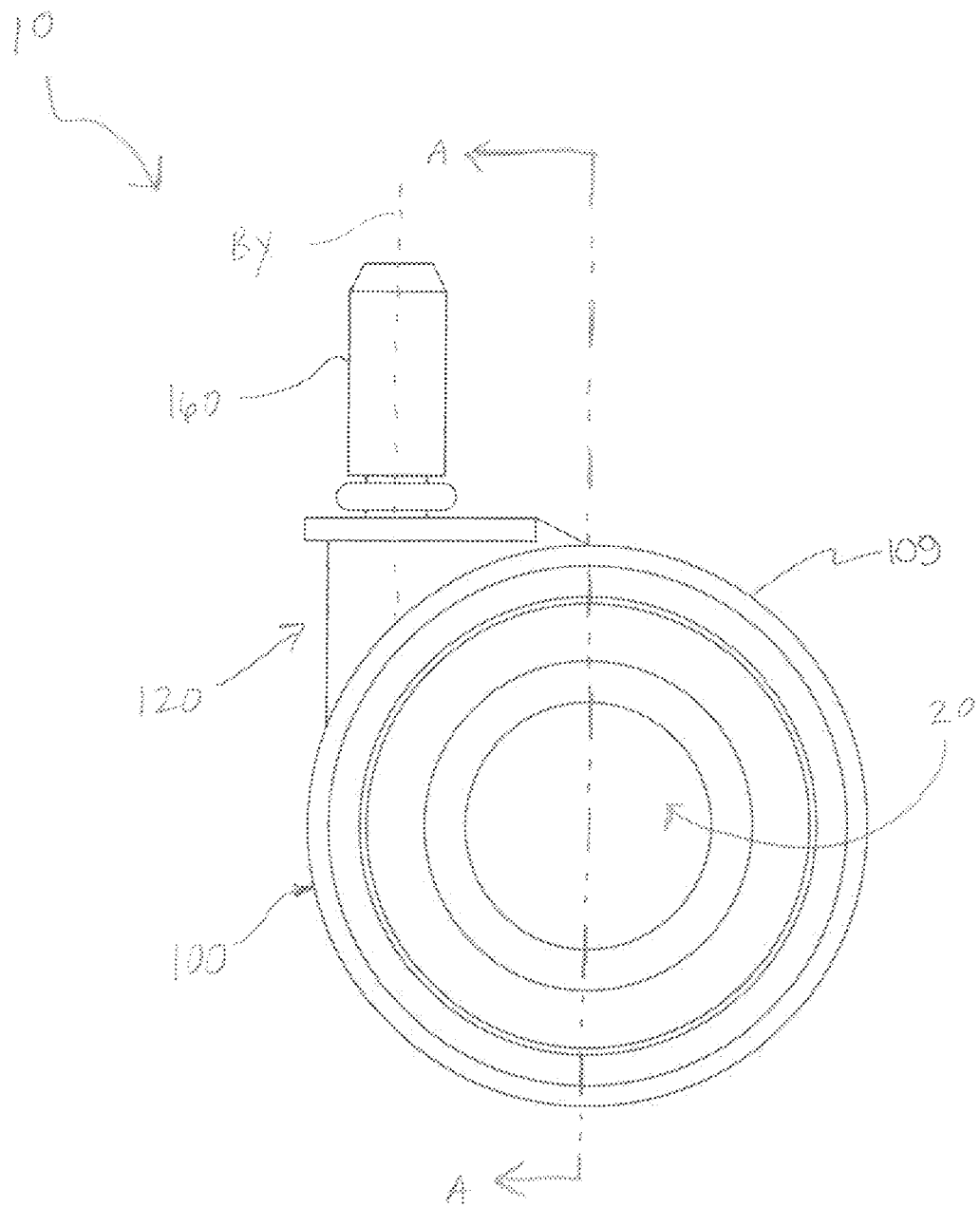

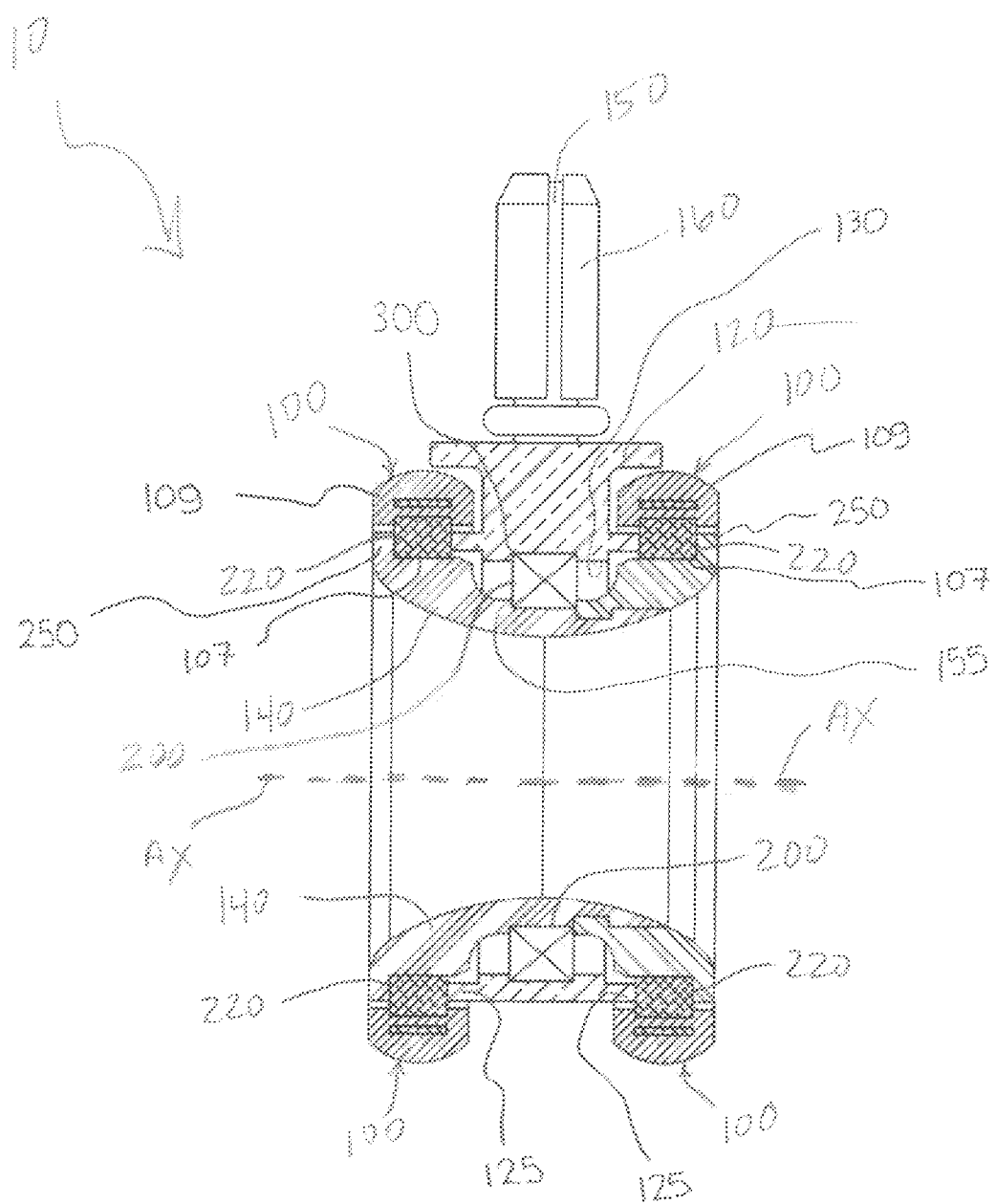

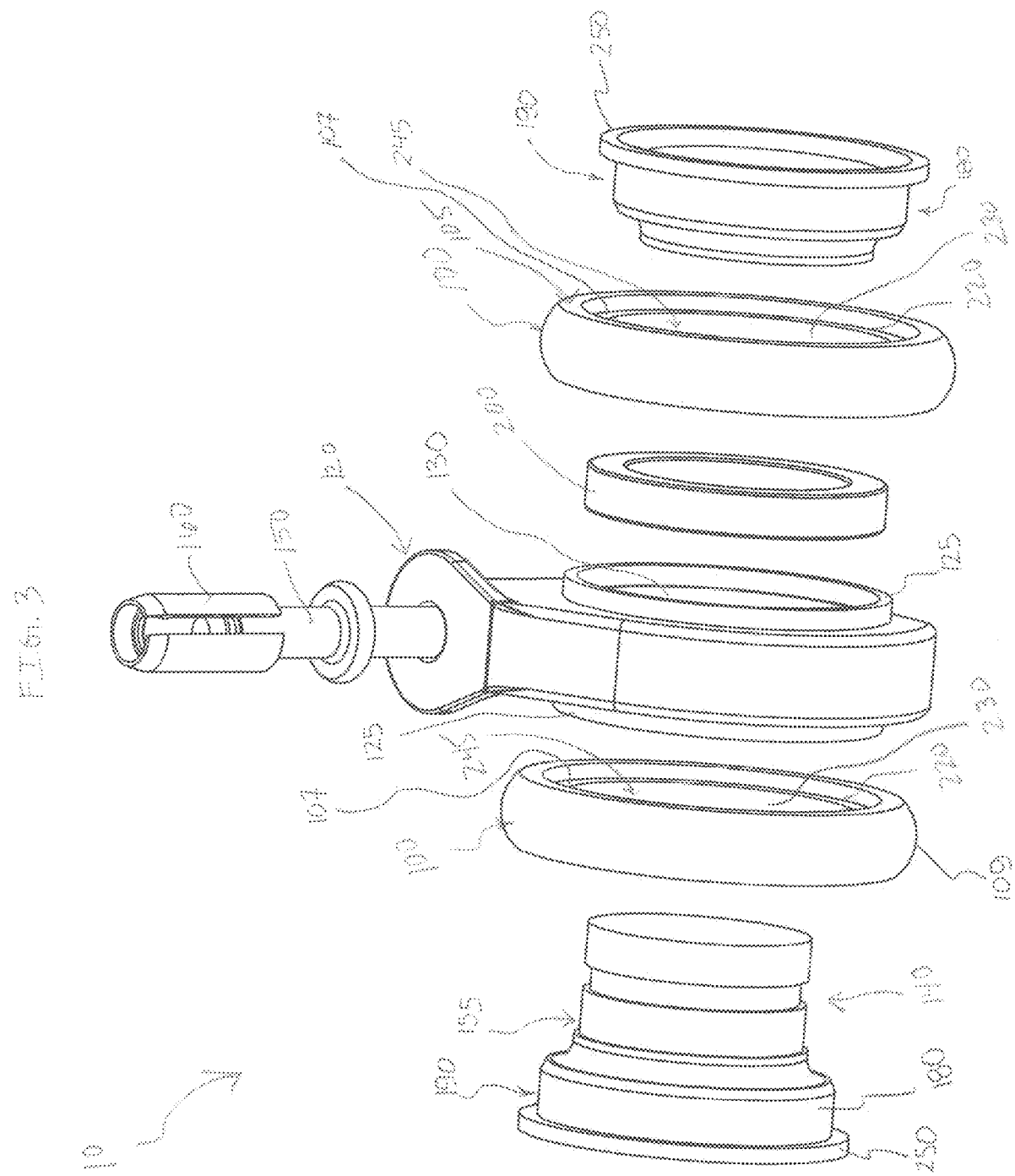

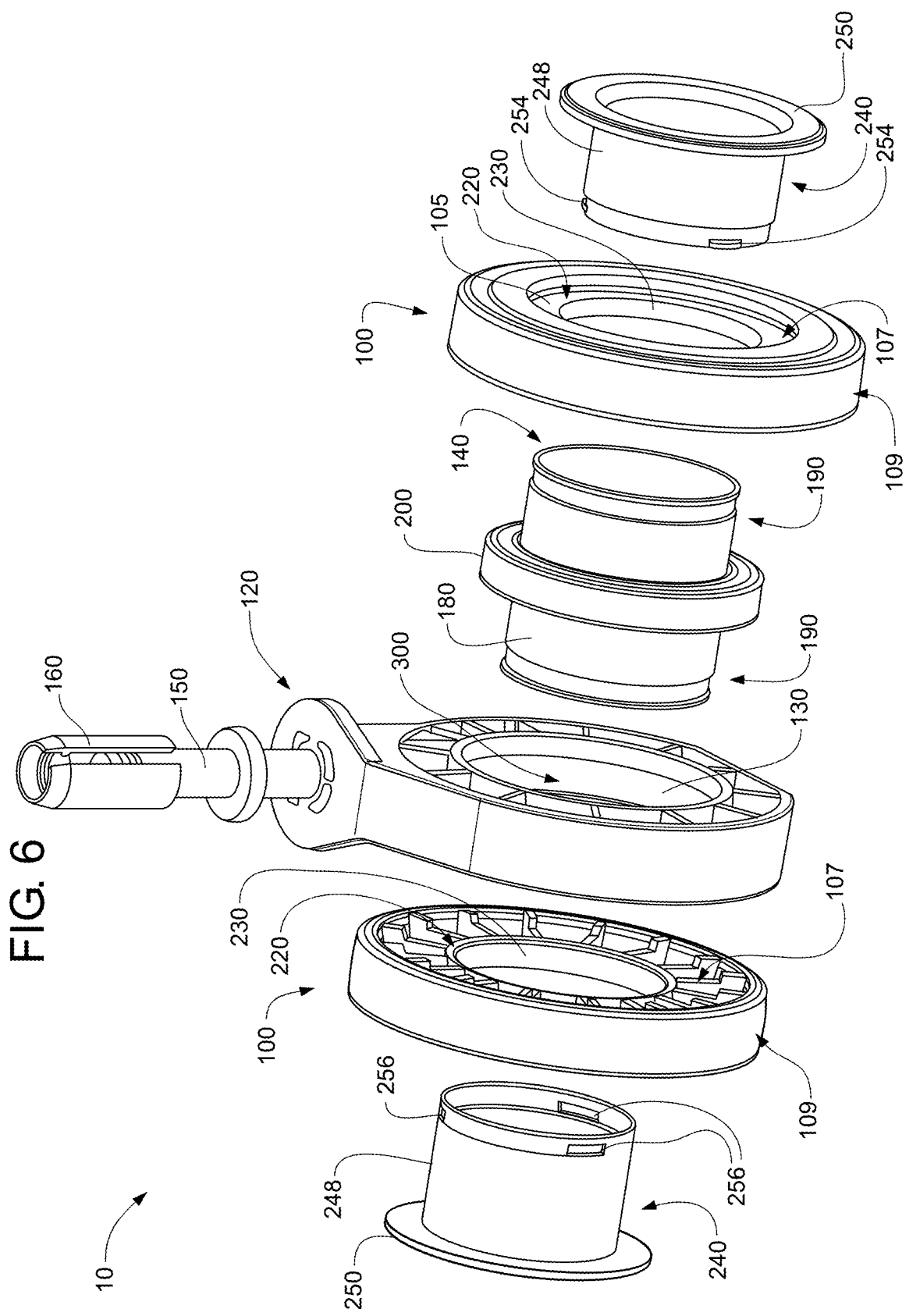

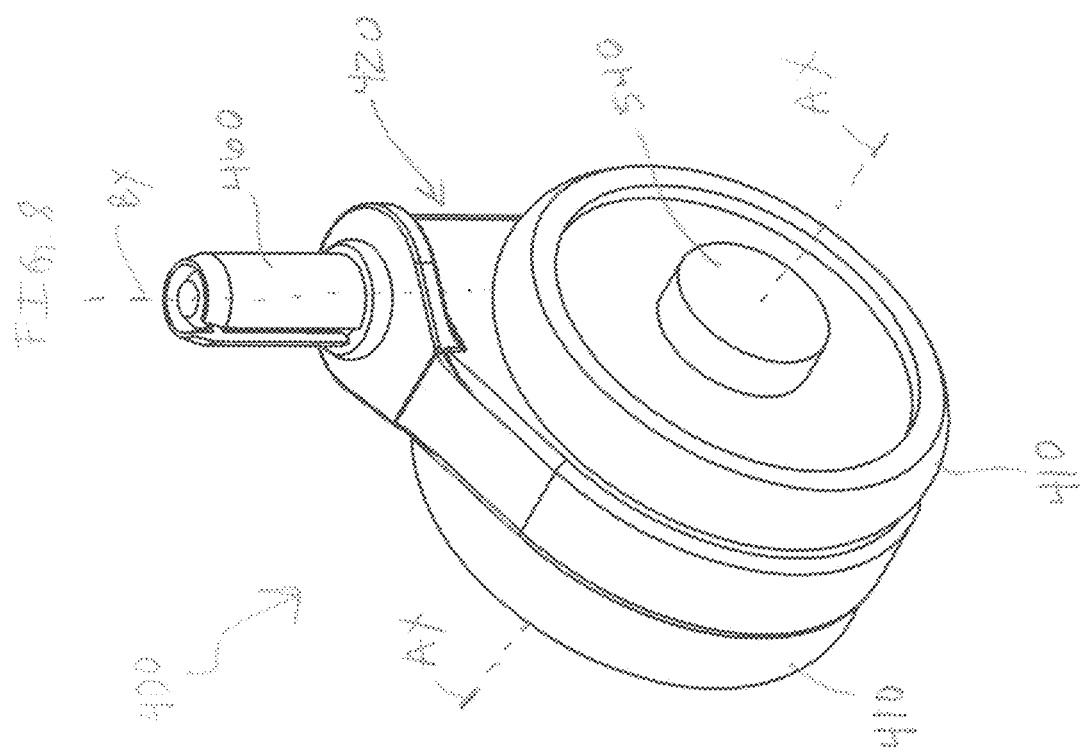
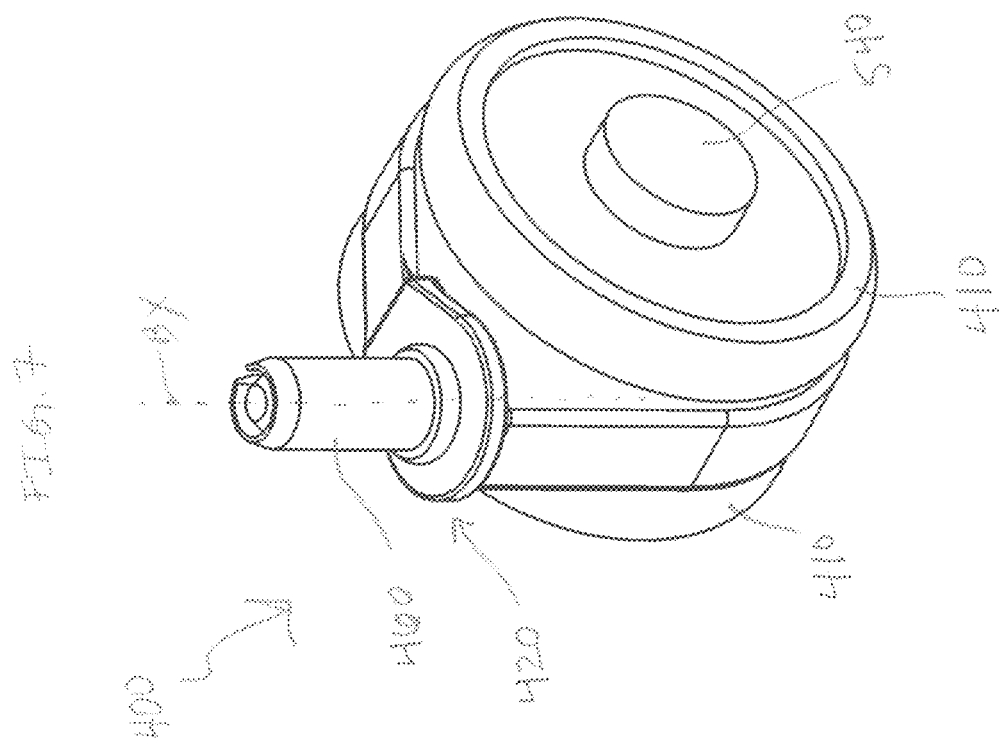

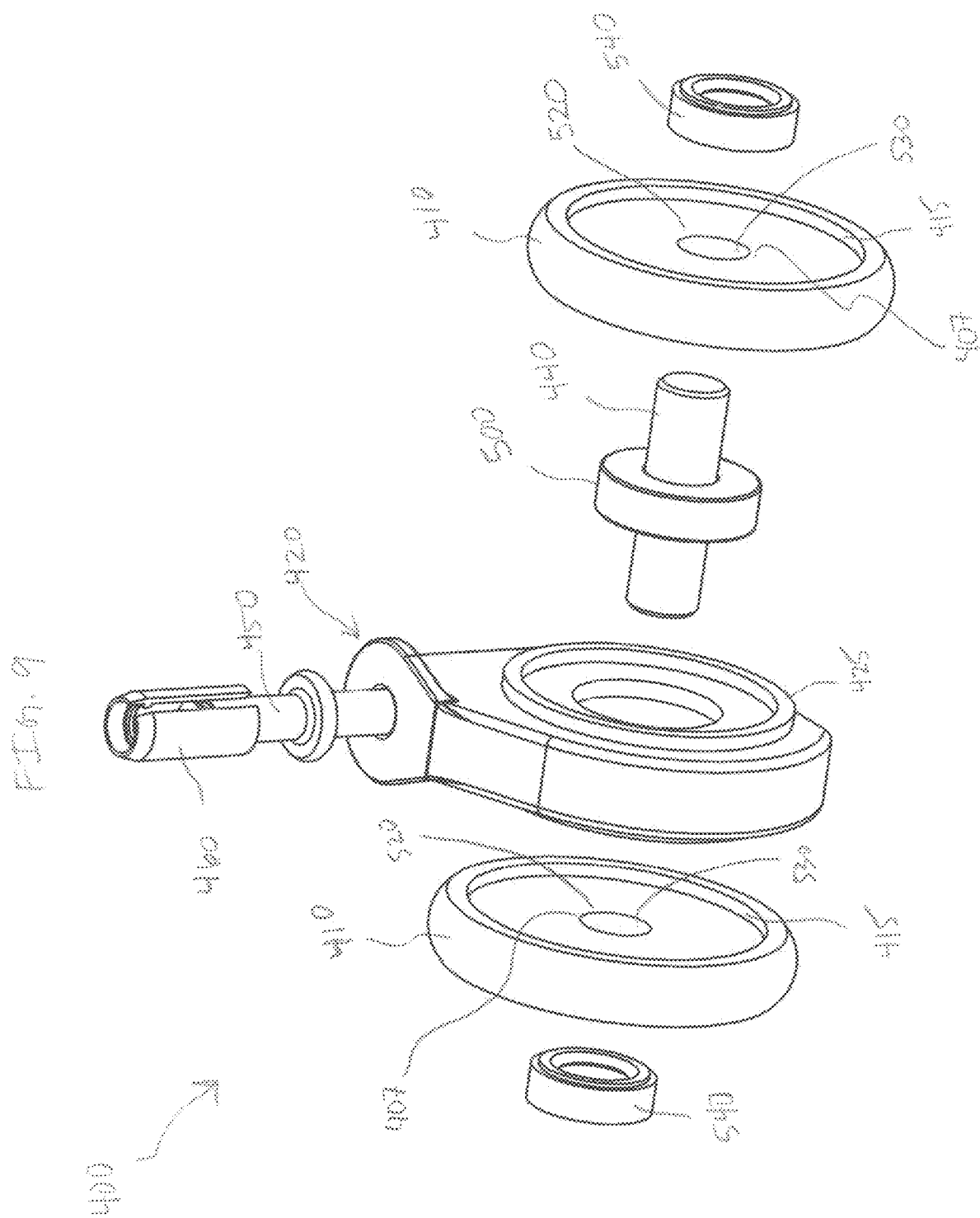

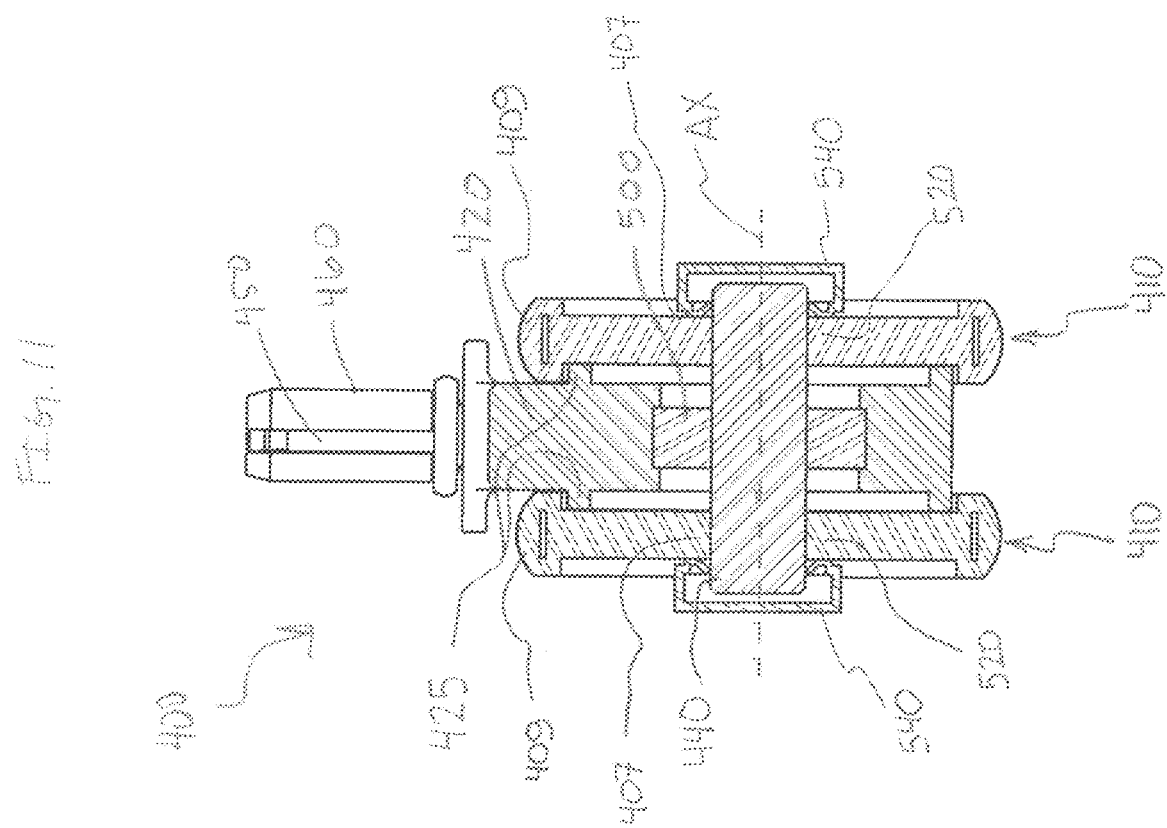
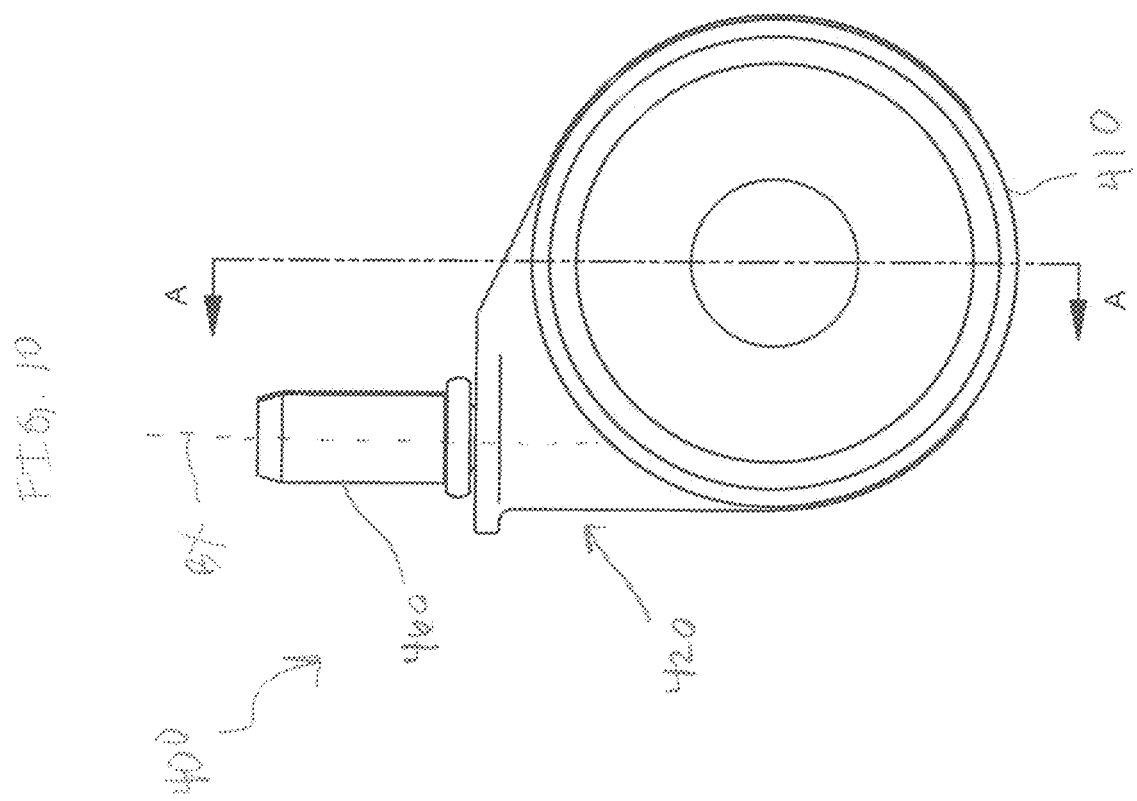

HYBRID BEARING ARRANGEMENT CASTER TECHNOLOGY

FIELD OF THE INVENTION

The present invention relates to caster technology. More specifically, the present invention provides a caster having a plurality of bearings that provide both straight-line rolling functionality and smooth swiveling functionality.

BACKGROUND OF THE INVENTION

Caster assemblies are well known. They are attached to an article to facilitate rolling movement of the article. Caster assemblies can be provided on any of a wide variety of articles, including chairs and other furniture (tables, sofas, beds, desks, etc.), computer stands, stands for medical equipment, cabinets, work surfaces, dollies, luggage, and the like.

Known caster designs include either rolling bearings or slide bearings. As is well known, a rolling bearing typically comprises a plurality of ball bearings or a plurality of cylinder bearings, whereas a slide bearing typically comprises a low-friction ring.

"Twin roll" casters have two wheels mounted adjacent to one another, so that the wheels may simultaneously rotate in opposite directions, thereby facilitating easier swiveling under load as compared to single wheeled casters. Radial ball bearings or roller bearings in each wheel are often used to increase load capacity and improve rolling function.

It would also be desirable to provide a caster having a hybrid bearing arrangement that includes both a rolling bearing and two slide bearings. Preferably, the caster facilitates both straight-line rolling functionality and smooth swiveling functionality. Further, it would be desirable to provide such a hybrid bearing system that has only a single rolling bearing. It would also be desirable to position such a rolling bearing at an advantageous location on the caster, e.g., such that it is particularly well protected against bearing contamination. Such a caster preferably also provides good rolling performance and load capacity.

SUMMARY OF THE INVENTION

Certain embodiments of the present invention provide a caster including two wheels, a central frame member, and a central mount member. Each of the two wheels is mounted on the central mount member. Each of the two wheels has a tread portion and a mount portion. The caster has a hybrid bearing arrangement comprising both a rolling bearing and two slide bearings. The rolling bearing is located between the central frame member and the central mount member, such that the rolling bearing is configured to enable the caster to roll along a straight line with each of the two wheels rotating in a common direction about a first axis. Each of the two slide bearings is located between the central mount member and the tread portion of a respective one of the two wheels, such that the two slide bearings are configured to enable the two wheels to simultaneously rotate in opposite directions when the caster swivels about a second axis. The first and second axes preferably are orthogonal to each other.

In some embodiments, the invention provides a hubless caster including two wheels, a central frame member, and a tubular mount member. Each of the two wheels is mounted on the tubular mount member. Each of the two wheels has a tread portion and a mount portion. The hubless caster surrounds an open central corridor. The hubless caster has a hybrid bearing arrangement comprising both a rolling bearing and two slide bearings, such that the hubless caster has only one rolling bearing. The rolling bearing is located between the central frame member and the tubular mount member, such that the rolling bearing is configured to enable the hubless caster to roll along a straight line with each of the two wheels rotating in a common direction about a first axis. Each of the two slide bearings is located between the tubular mount member and the tread position of a respective one of the two wheels, such that the two slide bearings are configured to enable the two wheels to simultaneously rotate in opposite directions when the hubless caster swivels about a second axis. The first and second axes preferably are orthogonal to each other.

BRIEF DESCRIPTION OF THE DRAWINGS

FIG. 1 is a side view of a hubless caster in accordance with certain embodiments of the present disclosure.

FIG. 2 is a cross-sectional view of the caster of FIG. 1, taken along line A-A of FIG. 1.

FIG. 3 is an exploded perspective view of the caster of FIG. 1.

FIG. 6 is an exploded perspective view of the caster of FIG. 4.

FIG. 7 is a side perspective view of still another caster in accordance with certain embodiments of the present disclosure.

FIG. 8 is another side perspective view of the caster of FIG. 7.

FIG. 9 is an exploded perspective view of the caster of FIG. 7.

FIG. 10 is a side view of the caster of FIG. 7.

FIG. 11 is a cross-sectional view of the caster of FIG. 10, taken along line A-A of FIG. 10.

DETAILED DESCRIPTION OF PREFERRED EMBODIMENTS

Figure 5:
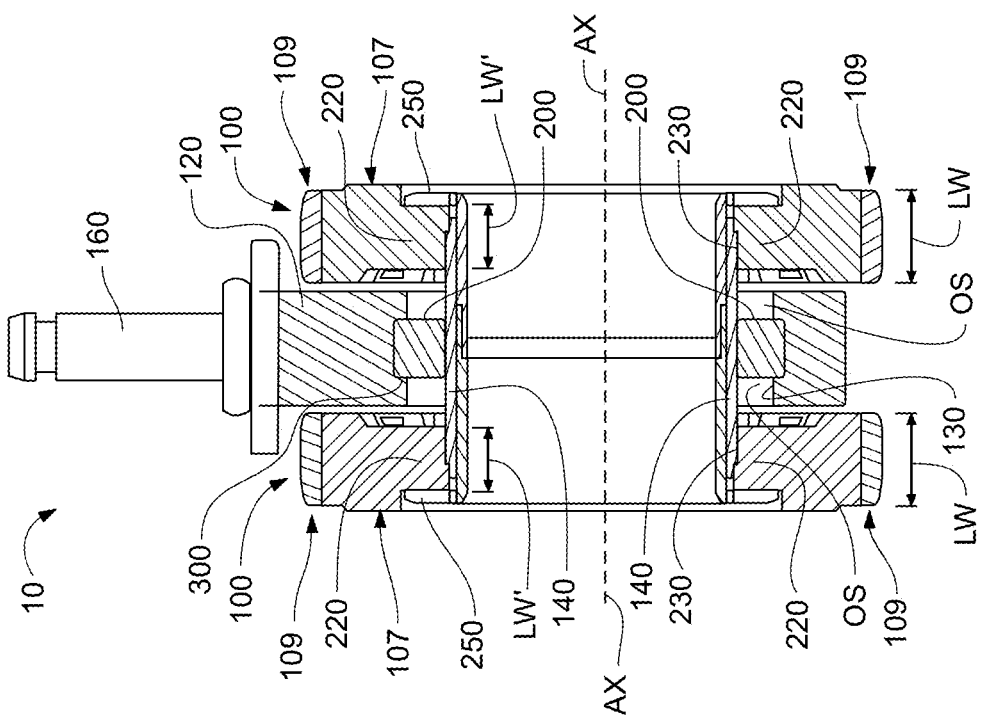
FIG. 5 is a cross-sectional view of the caster of FIG. 4, taken along line A-A of FIG. 4.

The following detailed description is to be read with reference to the drawings, in which like elements in different drawings have like reference numerals. The drawings, which are not necessarily to scale, depict selected embodiments and are not intended to limit the scope of the invention. Skilled artisans will recognize that the examples provided herein have many useful alternatives that fall within the scope of the invention.

Referring to the drawings, there are shown various casters of the present disclosure generally represented by reference numerals 10 (FIGS. 1-6) and 400 (FIGS. 7-11). Caster 10 is a hubless caster, whereas caster 400 has an axle on the caster's wheel-rotation axle. The hybrid bearing arrangement of the present invention can be incorporated advantageously into various different types of casters.

Figure 4:
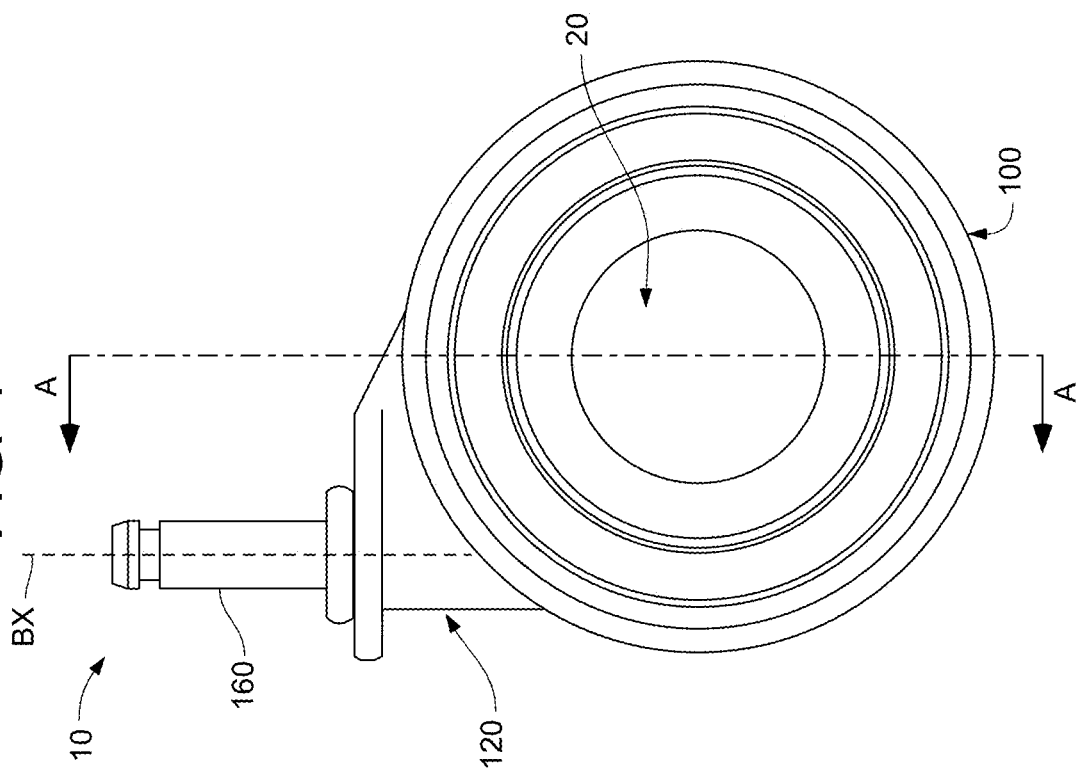
FIG. 4 is a side view of another hubless caster in accordance with certain embodiments of the present disclosure.

The casters 10, 400 are configured to be attached to a desired article (e.g., a chair, table, bed, desk, computer stand, a stand for medical equipment, luggage, or the like) so as to facilitate rolling movement of the article. FIGS. 1 and 4 show different embodiments of caster 10 assembled, whereas FIGS. 3 and 6 show those embodiments of caster 10 disassembled/exploded. Similarly, FIGS. 7, 8, 10, and 11 show caster 400 assembled, whereas FIG. 9 shows caster 400 disassembled/exploded.

The caster 10, 400 generally includes a central frame member 120, 420, two wheels 100, 410, and a central mount member 140, 440. The caster 10, 400 has an advantageous hybrid bearing arrangement, which is described later.

As shown in FIGS. 1-6, caster 10 is a hubless caster and surrounds an open central corridor 20 (e.g., a generally cylindrical open space centered on axis AX). Thus, illustrated caster 10 is devoid of an axle on axis AX. Hubless caster 10 includes two wheels 100, a central frame member 120, and a mount member 140, which preferably is tubular and thus is referred to hereinafter as tubular mount member 140. The wheels 100 are mounted on the tubular mount member 140. Each of the two wheels 100 preferably comprises a tread portion 109 and a mount portion 107. The tread portion 109 and mount portion 107 may both be defined by a single body, or they may be defined by multiple bodies. For example, the tread portion 109 and mount portion 107 of each wheel 100 can optionally be defined by a single, uniform construction (e.g., a single body comprising polymer and/or being a composite, such as a single hard-tire construction). In other cases, a softer tread portion 109 can be attached to a harder (e.g., more durable) mount portion 107. The mount portion 107 preferably is located closer to axis AX than is (e.g., radially inside of) the tread portion 109. In preferred embodiments, each wheel 100 is mounted on a respective end region of the tubular mount member 140. The tubular mount member 140 is configured to rotate relative to, and radially within, the central frame member 120. In addition, the wheels 100 are configured to rotate about the tubular mount member 10, e.g., such that the two wheels are capable of simultaneously rotating in opposite directions about axis AX. Axis AX may also be referred to herein as the first axis or the wheel-rotation axis.

The central frame member 120 preferably has a generally ring-shaped configuration. It may be formed of polymer, metal, or composite. In some cases, the central frame member 120 is a single body, optionally formed of acetal. The central frame member 120 preferably has a shoulder portion (e.g., forming a corner at a top of the caster). The shoulder portion is perhaps best shown in FIGS. 1 and 4. The shoulder portion can be configured to have (e.g., receive) a caster stem. The shoulder portion can be articulated to one side so as to allow the caster to swivel about the caster stem. More will be said of this later.

In some embodiments, the central frame member 120 includes two ring-shaped rim portions 125 that project outwardly (e.g., axially) from opposite sides of the central frame member 120 (FIG. 3). In such embodiments, a portion of each wheel 100 can optionally be carried alongside the ring-shaped rim portion 125 on a respective side of the central frame member 120. For example, the mount portion 107 of each wheel 100 can optionally be carried alongside the rim portion 125 on the adjacent side of the central frame member 120. As will be appreciated, when the wheels rotate about axis AX, such rotation is relative to the central frame member (and relative to rim portions, when provided).

In preferred embodiments, a caster stem 150 is mounted to the central frame member 120. In such cases, the caster stem can optionally be formed of metal while the central frame member is formed of polymer (or composite). The caster stem 150 can alternatively be integral to the central frame member 120. Another option is to have a vertical through-hole in the frame and have the caster stem go all the way through the hole and be secured on the bottom side of the hole either by mechanical deformation or a fastener. When provided, the caster stem 150 allows the caster 10 to be attached to a desired article such that the caster is free to pivot (e.g., swivel) relative to the article. Regardless of the particular manner of providing for attachment between the caster and the article, caster 10 preferably is a swivel caster. In more detail, when the caster 10 is attached to an article, the caster preferably is configured to rotate about 360 degrees (e.g., about a vertical axis, such as axis BX) relative to the article. In certain embodiments, an optional friction sleeve 160 is provided that surrounds the caster stem 150. In other cases, the optional friction sleeve 160 is replaced with a conventional metal friction ring. The teachings of this paragraph also apply to caster 400.

The hubless caster 10 has a hybrid bearing arrangement comprising both a rolling bearing 200 and two slide bearings 220. Preferably, the caster has only one rolling bearing 200. Thus, the caster preferably has a hybrid bearing arrangement with a single rolling bearing 200 and two slide bearings 220. This can provide various advantages, such as reduced risk of bearing contamination, reduced weight, and reduced cost.

Each of the two illustrated slide bearings 220 is located between the tubular mount member 140 and the tread portion of a respective one of the two wheels 100. In the embodiments illustrated, the mount portion 107 of each wheel 100 defines a respective one of the two slide bearings 220. The two slide bearings 220 are configured to enable the two wheels 100 to simultaneously rotate in opposite directions (e.g., relative to the tubular mount member) about the first axis AX, e.g., when the hubless caster 10 swivels (e.g., pivots or rotates) about a second axis BX. The second axis BX preferably is orthogonal to the first axis AX. This arrangement of the slide bearings 220 enables smooth swiveling of the caster 10 (e.g., when the wheels are on the ground and the caster is under a load).

Preferably, the slide bearing 220 of each wheel comprises a ring having a bearing surface 230. The ring preferably is defined by the mount portion of the wheel. The bearing surfaces 230 of the slide bearings 220 are configured to slide on the tubular mount member 140 when the two wheels 100 rotate relative to the tubular mount member 140. Each illustrated slide bearing is a plain bearing, which is devoid of rolling elements.

The bearing surfaces 230 of the slide bearings 220 preferably are defined by low-friction material. In some embodiments, the bearing surfaces 230 comprise a metal (e.g., polished metal). In other embodiments, the bearing surfaces 230 comprise a polymer. Skilled artisans will appreciate that the bearing surfaces 230 can comprise one or more metals, one or more polymers, or any other suitable low-friction material. In some cases, the bearing surfaces 230 of the slide bearings 220 comprise a combination of polytetrafluoroethylene (or "PTFE," such as Teflon) and acetal (i.e., polyoxymethylene or "POM"). More generally, the bearing surfaces 230 can optionally comprise POM, PTFE, or both. In some cases, a blend of POM and PTFE fibers is used. In such cases, the PTFE fibers may be distributed homogeneously in the POM. If desired, the mount portion 107 may be a ring comprising, consisting essentially of, or consisting of such a blend. It is to be appreciated, however, that such materials are by no means required. If desired, conventional liquid (e.g., grease) lubricant, dry-film lubricant, and/or lubristic coatings can be applied to the bearing surface areas.

An outer surface 180 of the tubular mount member 140 comprises two bearing surface areas 190. These bearing surface areas 190 preferably are defined by low-friction material, and can optionally be enhanced by conventional liquid lubricants (e.g., grease), dry-film lubricants, and/or lubristic coatings. In some cases, the bearing surface areas 190 are defined by metal (e.g., polished metal), polymer, or another suitable low-friction material (e.g., a composite). If desired, the bearing surface areas 190 of the tubular mount member 140 can be defined by a combination of Teflon and acetal. Due to the low-friction sliding interface between the tubular mount member 140 and the two slide bearings 220 (which can optionally be defined by the mount portions 107 of the two wheels 100), the two wheels are able to simultaneously rotate in opposite directions so as to facilitate smooth swiveling.

The mount portion 107 of each wheel 100 is, in some cases, defined by the same single body (e.g., a single polymer body) that defines the tread portion of the wheel. In other cases, the mount portion 107 and the tread portion 109 of each wheel 100 comprise separate bodies that are joined together (e.g., so as to be conjointly rotatable) to form the wheel 100. In certain embodiments, the mount portion 107 and the tread portion 109 are formed of different materials. For example, the tread portion may be formed of a first material, the mount portion may be formed of a second material, and the second material may have a greater hardness than the first material. As one non-limiting example, the mount portion may comprise acetal while the tread portion comprises urethane. As noted above, the tubular mount member 140 has an outer surface 180 that comprises two bearing surface areas 190. In FIG. 5, for each wheel 100, the illustrated tread portion 109 has a lateral width LW that is greater than the lateral width LW' of the corresponding bearing surface area 190 of the outer surface 180 of the tubular mount member 140.

If desired, for each wheel 100, the mount portion 107 and the tread portion 109 can be formed by a single body. As one example, for soft floor applications, the mount portion 107 and the tread portion 109 can optionally be formed by a single body of a relatively hard polymer, such as acetal. In such cases, each wheel 100 may consist of a single body formed of polymer, optionally acetal.

In some embodiments, the tread portion of each wheel comprises (or consists of) a polymer having a durometer of greater than 45, such as greater than 50, but less than 110. The durometer ranges noted herein refer to the Shore A durometer scale. One suitable polymer is urethane.

The tread portion 109 of each wheel 100 can optionally be formed of a medium durometer polymer having a durometer of about 50-110, such as 55-105 (e.g., about 85-95). Preferably, the tread portion 109 has a thickness of at least 0.03 inch, or at least 0.075 inch (e.g., about 0.087 inch). This can be advantageous when using a medium durometer polymer, such as a medium durometer urethane. By forming the tread portion 109 of a medium durometer polymer, the caster may be well suited for use on both hard and soft floors. It is to be appreciated, however, that the present casters are by no means limited to any particular wheel durometer range.

The mount portion 107 of each wheel 100 preferably is located radially interior of (e.g., radially within) the tread portion 109. In the embodiments illustrated, for each wheel 100, the mount portion 107 defines (e.g., is) the slide bearing 220. Thus, for each wheel 100, the slide bearing 220 preferably is located radially interior of (in some cases, mounted radially within) the tread portion 109. The mount portion 107 and tread portion 109 of each wheel 100 preferably are configured (in some cases, joined together) to rotate together relative to the tubular mount member 140. The teachings of this paragraph and the four immediately preceding paragraphs also apply to caster 400.

In FIGS. 2, 3, 5, and 6, the illustrated hubless caster 10 has a single (i.e., only one) rolling bearing 200. Here, the rolling bearing 200 is located between (e.g., radially between) the central frame member 120 and the tubular mount member 140. Preferably, the rolling bearing 200 is mounted on the tubular mount member 140 (e.g., on an outer surface 180 thereof) so as to be positioned between (e.g., axially between) the two wheels 100. The rolling bearing 200 is configured to enable the hubless caster 10 to roll along a straight line (i.e., in a linear direction) with each of the two wheels 100 rotating in the same direction about a first axis AX. Thus, when the caster 10 is rolling in a straight line, the rolling bearing 200 will be activated such that both wheels 100 rotate together with the tubular mount member 140 (e.g., about axis AX) relative to the central frame member 120.

In some embodiments, such as those shown in FIGS. 2 and 5, the rolling bearing 200 is located at a position axially offset from (e.g., axially between) the two slide bearings 220. Preferably, the rolling bearing 200 is located at a midpoint between the two wheels 100 in the axial direction (e.g., parallel to axis AX). Thus, there may be open space OS between the rolling bearing and each of the two slide bearings. This is shown in FIGS. 2 and 5. This, however, is not required.

In embodiments where a rolling bearing is located between (e.g., centrally of) the two wheels and radially interior of (e.g., radially within) the central frame member, the caster can be particularly resistant to bearing contamination. This can be due to the location of the rolling bearing in a relatively protected position. In addition, the location may provide such an advantage without sacrificing load capacity or rolling performance. The teachings of this paragraph and the immediately preceding paragraph also apply to the caster of FIGS. 7-11.

With respect to providing resistance to bearing contamination, by providing the rolling bearing at a more remote location of the caster, the caster can be more resistant to water and dirt accessing the roller bearing. It will be appreciated that the ingress path for water and dirt can be made more difficult in this way.

As can be appreciated by referring to FIGS. 2, 5, and 11, the caster 10, 400 can advantageously have a single rolling bearing 200, 500 that is surrounded collectively by the central frame member 120, 420, the mount member 140, 440, and the two wheels 100, 410. Preferably, the rolling bearing 200, 500 is located radially between the central frame member 120, 420 and the mount member 140, 440 and is located axially between the two wheels 100, 410.

Certain embodiments of the caster 10, 400 involve the rolling bearing 200, 500 comprising inner and outer rings (e.g., inner and outer races) formed by stainless steel walls. In other cases, they are chrome steel. In some cases, coatings are provided on surfaces (e.g., on interior surfaces that are in contact with ball bearings of the rolling bearing) of the inner and outer rings of the rolling bearing. In such cases, the caster 10, 400 can optionally be devoid of grease or any other liquid lubricant. Another possibility is to provide a heat treatment and/or chemical treatment that provide dry lubricant to the caster. The noted coatings may likewise provide dry lubricant to the caster. Thus, the inner and outer rings of the rolling bearing can optionally have dry lubricant coating or surface treatment and the caster may be devoid of liquid lubricant, optionally together with the inner and outer rings of the rolling bearing being formed of stainless steel. Embodiments of this nature may be desirable, for example, in various medical facility applications.

In some cases, the rolling bearing 200 comprises a plurality of ball bearings. In other cases, the rolling bearing 200 comprises a plurality of cylinder (e.g., pin) bearings. The rolling bearing can comprise two metal walls, one rotatable relative to the other, that collectively house a plurality of ball or cylinder bearings. For example, the rolling bearing 200 can be a conventional radial thin section bearing. One suitable commercially available bearing is the 6807-ZZ Radial Thin Section Ball Bearing manufactured by VXB Ball Bearings of Anaheim, Calif., USA. Other suitable commercially available bearings can be obtained from SST Bearings of Loveland, Ohio, USA.

The rolling bearing 200 can optionally have a thin section. In some cases, the thickness (measured in the radial direction) of the rolling bearing 200 is less than ½ inch, less than ⅓ inch, less than 0.3 inch, less than 0.275 inch, or even less than 0.27 inch. The rolling bearing in any embodiment of the present disclosure can optionally have a thickness within one or more of these ranges.

In certain embodiments where the caster 10, 400 has only a single rolling bearing 200, 500 and that rolling bearing comprises a plurality of ball bearings, the caster is devoid of other ball bearings. This can optionally be the case in any embodiment of the present disclosure.

In some embodiments, the outer surface 180 of the tubular mount member 140 has a channel 155 formed (e.g., recessed) therein. Reference is made to FIG. 2. In such embodiments, the rolling bearing 200 is mounted in the channel 155. This, however, is by no means required. In some cases, channel 155 has a lateral width (measured parallel to axis AX) substantially matching the lateral width of the rolling bearing 200.

The central frame member 120 of the caster 10 has a radially interior face 130. In some embodiments, the radially interior face 130 of the central frame member 120 has a channel 300 therein. This channel may face a radially inward direction. Reference is made to FIGS. 2 and 5. In embodiments of this nature, the rolling bearing 200 is received in the channel 300. Preferably, the channel 300 has a lateral width substantially matching the lateral width of the rolling bearing 200.

The channel 300 can optionally result from over-molding the central frame member 120 around the rolling bearing 200. Thus, the central frame member 120 may be over-molded to the rolling bearing 200. In such cases, opposed side portions of the central frame member preferably embrace both sides of the rolling bearing (e.g., embrace an outer ring of the rolling bearing). This may be the case for embodiments where the central frame member is over-molded to the rolling bearing as well as for certain embodiments where over-molding is not used. Thus, it can be appreciated that the central frame member 120 may laterally encapsulate the outer ring of the rolling bearing, optionally so as to permanently encapsulate the rolling bearing. In other cases, the rolling bearing is installed against a shoulder and retained on the other side by a snap ring, circlip, or other retaining shoulder. Alternatively, the rolling bearing can be snapped into a groove, press fit and/or bonded in place. The rolling bearing can optionally be centered laterally (i.e., in a direction parallel to axis AX) within and relative to the central frame member. The teachings of this paragraph and the immediately preceding paragraph also apply to caster 400.

In certain embodiments, the hubless caster 10 further includes a pair of retainers 240. Reference is made to the embodiment of FIGS. 4-6. Here, the two retainers 240 are joined together so as to form a tubular sleeve and two retention flanges. The sleeve is mounted radially within the tubular mount member. The two retention flanges project radially outwardly from the sleeve, so as to be positioned to retain the two wheels on the tubular mount member.

As shown most clearly in FIG. 6, each retainer 240 includes a base 248 and a flange 250. Each flange 250 projects radially outwardly from an outer end of the corresponding base 248. Each base 248 is received radially within the tubular mount member 140. Each flange 250 abuts an outer surface 105 of a respective one of the wheels 100. In the embodiment of FIGS. 4-6, the retention flange 250 abutting a given wheel 100 is carried alongside (e.g., bears against) the mount portion 107 of such wheel. Since the mount portion 107 may define the slide bearing 220, the flange 250 may be configured to rotate relative to (e.g., slide against) the slide bearing.

The two retainers 240 in the embodiment of FIGS. 4-6 can be directly coupled to each other (e.g., via a snap-fit connection or any other mechanical connection). For example, as shown in FIG. 6, one of the retainers 240 can include projections 254, while the other retainer has corresponding apertures 256. The projections 254 are configured to be received within the apertures 256 to couple (e.g., lock or otherwise retain) the two retainers 240 together.

Rather than having two separate retainer rings, as in FIGS. 4-6, the tubular mount member 140 itself may define two retention flanges 250. Reference is made to FIGS. 1-3. Here, each retention flange 250 projects radially outwardly. These retention flanges may be carried alongside the mount portions 107 of the wheels 100 in the same manner as described above for the flanges in FIGS. 4-6. Thus, the retention flanges 250 preferably are positioned to retain the two wheels on the tubular mount member.

In the embodiment shown in FIGS. 4-6, the tread portion 109 of each of the two wheels 100 has a lateral width, the mount portion 107 of each of the two wheels 100 has a bearing surface 230 configured to slide along a corresponding surface area ("bearing surface area") 190 of the tubular mount member 140 when the two wheels 100 rotate relative to the tubular mount member 140. In the illustrated embodiment, as shown in FIG. 6, for each of the two wheels 100, the lateral width of the tread portion 109 is greater than a lateral width of the bearing surface area 190 of the tubular mount member 140.

In the embodiment of FIGS. 1-3, the tubular mount member 140 is shown formed by two separate ring-shaped bodies joined together. In FIGS. 4-6, the tubular mount member 140 is shown consisting of a single ring-shaped body. Various other options will be apparent to skilled artisans given the present teaching as a guide. Preferably, the tubular mount member 140 is in contact with the rolling bearing 200 and with both of the slide bearings 220.

While FIGS. 1-6 depict hubless caster embodiments, the invention is not limited to hubless casters. For example, the present hybrid caster arrangement can be advantageously provided on a caster having an axle on axis AX. One non-limiting example is shown in FIGS. 7-11. Here, the caster 400 includes two wheels 410, a central frame member 420, and a central mount member 440. Each of the two wheels 410 is mounted on, and is configured to rotate relative to (e.g., about), the central mount member 440. Preferably, the central mount member 440 has a generally cylindrical configuration (e.g., it may comprise a shaft) and is configured to rotate relative to, and radially within, the central frame member 420.

In some embodiments, the central frame member 420 includes two rim portions 425 that project outwardly (e.g., axially outwardly) from opposite sides of the central frame member 420 (FIG. 9). In such embodiments, a portion of each wheel 100 can optionally be carried alongside the rim portion 425 on a respective side of the central frame member.

As with caster 10, the central frame member 420 of caster 400 preferably has a caster stem 450. This arrangement allows the caster stem 450 to be attached to a desired article such that the caster is free to pivot (e.g., swivel) relative to the article. The illustrated caster stem 450 is mounted to the central frame member 420. If desired, a through-hole can be provided in the central frame member and the caster stem can be received in such through-hole and secured at the bottom, as noted above. The caster stem 450 can alternatively be integral to the central frame member 420. In certain embodiments, a friction sleeve 460 is provided that surrounds the caster stem 450. Alternatively, the friction sleeve 460 can be replaced with a conventional metal friction ring. When provided, caster stem 450 can be of the same nature as caster stem 150, which has already been described.

The caster 400 has a hybrid bearing arrangement comprising both a rolling bearing 500 and two slide bearings 520. The teachings above concerning the hybrid bearing arrangement on caster 10 also apply for caster 400. Each of the two slide bearings 520 is located between the central mount member 440 and the tread portion 409 of a respective one of the two wheels 410. The two slide bearings 520 are configured to enable the two wheels 410 to simultaneously rotate in opposite directions (i.e., relative to the mount member) about a first axis AX, e.g., when the caster 400 swivels about a second axis BX. Preferably, the first and second axes AX, BX are orthogonal to each other.

In FIGS. 9 and 11, caster 400 has a single (i.e., only one) rolling bearing 500. The rolling bearing 500 is located between the central frame member 420 and the central mount member 440 and is configured to enable the caster 400 to roll along a straight line with both of the two wheels 410 rotating in the same direction (e.g., together with the mount member) about the first axis AX relative to the central frame member.

In certain embodiments, the rolling bearing 500 is located at a position axially offset from (e.g., axially between) the two slide bearings 520. Preferably, the rolling bearing 500 is located at a midpoint between the two wheels 410 in an axial direction.

In some cases, the rolling bearing 500 comprises a plurality of ball bearings. In other cases, the rolling bearing 500 comprises a plurality of cylinder (e.g., pin) bearings. The ball bearings or cylinder bearings of the rolling bearing 500 are preferably housed between inner and outer walls (e.g., metal walls, such as metal rings) that respectively define inner and outer races of the rolling bearing 500. Rolling bearing 500 can be of the same nature as rolling bearing 200, which is described above. In certain embodiments where the rolling bearing 500 comprises a plurality of ball bearings, the caster 400 is devoid of other ball bearings.

In some embodiments, the mount portion 407 of each wheel 410 comprises a ring having a bearing surface 530. The bearing surfaces 530 are configured to slide on the central mount member 440 when the two wheels 410 rotate relative to the central mount member 440. The bearing surfaces 530 preferably are formed by a low-friction material to enable each wheel 410 to rotate in a low-friction manner. In some cases, the bearing surfaces 530 comprise a metal or a polymer. For example, the bearing surfaces 530 can optionally comprise smooth (e.g., polished) metal. In other cases, the bearing surfaces 530 comprise a polymer.

In the embodiment of FIGS. 7-11, each wheel 410 can optionally be formed by a single generally ring-shaped body. In such cases, the body may be metal, polymer, or composite. Thus, the mount portion 407 and the tread portion 409 can optionally be defined by a single body. In other cases, these portions 407, 409 of each wheel 410 can be formed by separate bodies joined together, as shown in FIG. 1-3 or 4-6. These examples, however, are by no means limiting.

Preferably, the two slide bearings 520 are defined respectively by the two mount portions 407 of the two wheels 410. The descriptions above concerning slide bearings 220 also apply to slide bearings 520.

In some embodiments, caster 400 includes a pair of retention rings 540. When provided, the retention rings 540 can optionally be mounted on end regions of the central mount member 440. In such cases, the retention rings 540 can advantageously be configured to retain the two wheels 410 on the central mount member 440.

Certain non-limiting exemplary manners of assembling a caster will now be described. First, the rolling bearing can be inserted into a molding tool, whereby the central frame member can be formed around the rolling bearing laterally encapsulating an outer ring of such bearing. Alternatively, the rolling bearing can be inserted into the central frame member after the central frame member is formed (via machining, casting, or molding depending on material), and the rolling bearing can be secured through various methods (e.g., snap into groove, one snap-ring and a shoulder on the opposite side, two snap-rings on opposite sides, friction fit, bonding, or the like). Next, the central mount member (which in some cases is tubular) can be inserted through an inner ring of the rolling bearing (alternatively, this could be done before the rolling bearing is inserted into the central frame member). The wheels can then be slid onto opposite ends of the mount member. In some cases, the mount member is tubular and retention rings 240 are inserted inside the mount member and attached together (e.g., snap-fitted together), such that retention flanges 250 thereof hold the wheels 100 on the caster 10 (see FIG. 5). In other cases, end caps 540 are subsequently affixed to the ends of the shaft (e.g., by threads, mechanical deformation, bonding, friction fit, snap ring, etc.). For embodiments of the type shown in FIGS. 7-11, the wheels could alternatively be snapped onto the ends of the mount member. While FIGS. 7-11 show a central mount member 440 protruding through each wheel, this is by no means necessary. Instead, the end of the mount member could terminate at the inner sides of the wheels, such that the central mount member is not visible when looking at a solid outer face of a wheel.

Thus, various embodiments of the invention are disclosed. One skilled in the art will appreciate that the present invention can be practiced with embodiments other than those disclosed. The disclosed embodiments are presented for purposes of illustration and not limitation, and the present invention is limited only by the claims that follow.

What is claimed is:

1. A hubless caster with a hybrid bearing arrangement, including:
   two wheels, each of the two wheels having a tread portion and a mount portion, the mount portion of each wheel defines a respective slide bearing surface;
   a central frame member defining a swivel axis;
   a rolling bearing;
   a tubular mount member, consisting of a single ring shaped body surrounding an open central corridor defining a rolling axis;
   wherein each of the two wheels mounted on the tubular mount member, the tubular mount member being in contact with both of the slide bearing surfaces, such that the two slide bearing surfaces are configured to slide on the tubular mount member when the two wheels rotate relative to the tubular mount member, which enables the two wheels to simultaneously rotate in opposite directions when the hubless caster swivels about the swivel axis; and wherein the rolling bearing is mounted on the tubular mount member between the two wheels, the rolling bearing directly contacts the tubular mount member and the central frame member, such that the rolling bearing is configured to enable the hubless caster to roll along a straight line with each of the two wheels rotating in a common direction about the rolling axis.

2. The hubless caster of claim 1 wherein the rolling bearing is located at a position axially offset from the two slide bearings, such that there is open space between the rolling bearing and each of the two slide bearings.

3. The hubless caster of claim 1 wherein the rolling bearing is located at a midpoint between the two wheels in an axial direction.

4. The hubless caster of claim 1 wherein the rolling bearing comprises a plurality of ball bearings and the hubless caster is devoid of other ball bearings.

5. The hubless caster of claim 1 wherein the central frame member has a radially interior face having a channel formed therein, the rolling bearing being received in the channel.

6. The hubless caster of claim 1, wherein the rolling and swivel axes are orthogonal to each other.

7. The hubless caster of claim 1 wherein the open central corridor is open entirely through the hubless caster such that when looking at the hubless caster from a side one can see entirely through the hubless caster by looking through the open central corridor.

8. The hubless caster of claim 1 wherein the two slide bearings respectively are located directly radially inward of the tread portions of the two wheels.

9. The hubless caster of claim 1 wherein the two slide bearings respectively comprise two bearing surfaces configured to slide respectively on two bearing surface areas of the tubular mount member, such that the two bearing surfaces face radially inward while the two bearing surface areas face radially outward.

10. The hubless caster of claim 1 wherein the rolling bearing comprises two metal walls, one rotatable relative to the other, that collectively house a plurality of ball bearings or cylinder bearings.

11. The hubless caster of claim 1 wherein the rolling bearing has a thickness, measured in a radial direction, of less than 0.275 inch.

* * * * *